United States Patent [19]

Shapiro

[11] Patent Number: 4,472,671

[45] Date of Patent: Sep. 18, 1984

[54] INVERTER STARTUP CIRCUIT

[75] Inventor: Haskell Shapiro, Corona del Mar, Calif.

[73] Assignee: Able Corporation, Anaheim, Calif.

[21] Appl. No.: 465,359

[22] Filed: Feb. 9, 1983

[51] Int. Cl.³ .............................................. H02P 5/40
[52] U.S. Cl. .................................. 318/811; 318/801; 318/809
[58] Field of Search ............................... 318/800–811; 363/37, 95

[56] References Cited

U.S. PATENT DOCUMENTS 4,002,958  1/1977  Akamatsu ........................... 318/811
4,189,669  2/1980  Van Loon et al. .................. 318/811
4,330,817  5/1982  Avar et al. .......................... 318/808

Primary Examiner—J. V. Truhe
Assistant Examiner—Arthur G. Evans
Attorney, Agent, or Firm—William W. Haefliger

[57] ABSTRACT

A control circuit for a DC inverter for an induction motor comprises:
  circuitry to produce a control waveform characterized by a sequence of pulse groups wherein the durations of the pulse groups increase with time, and wherein the widths of the pulses within each group increase with time, the circuitry supplying the waveform to the inverter.

The circuits typically includes:
  (i) a first oscillator having a sawtooth output,
  (ii) a ramp generator having a voltage output which changes with time,
  (iii) a first comparator operatively connected with and responsive to the first oscillator and ramp generator outputs to produce an output characterized by a duty cycle which increases with time, and
  (iv) a second oscillator responsive to the comparator output to produce an output having a frequency which increases with time.

9 Claims, 6 Drawing Figures

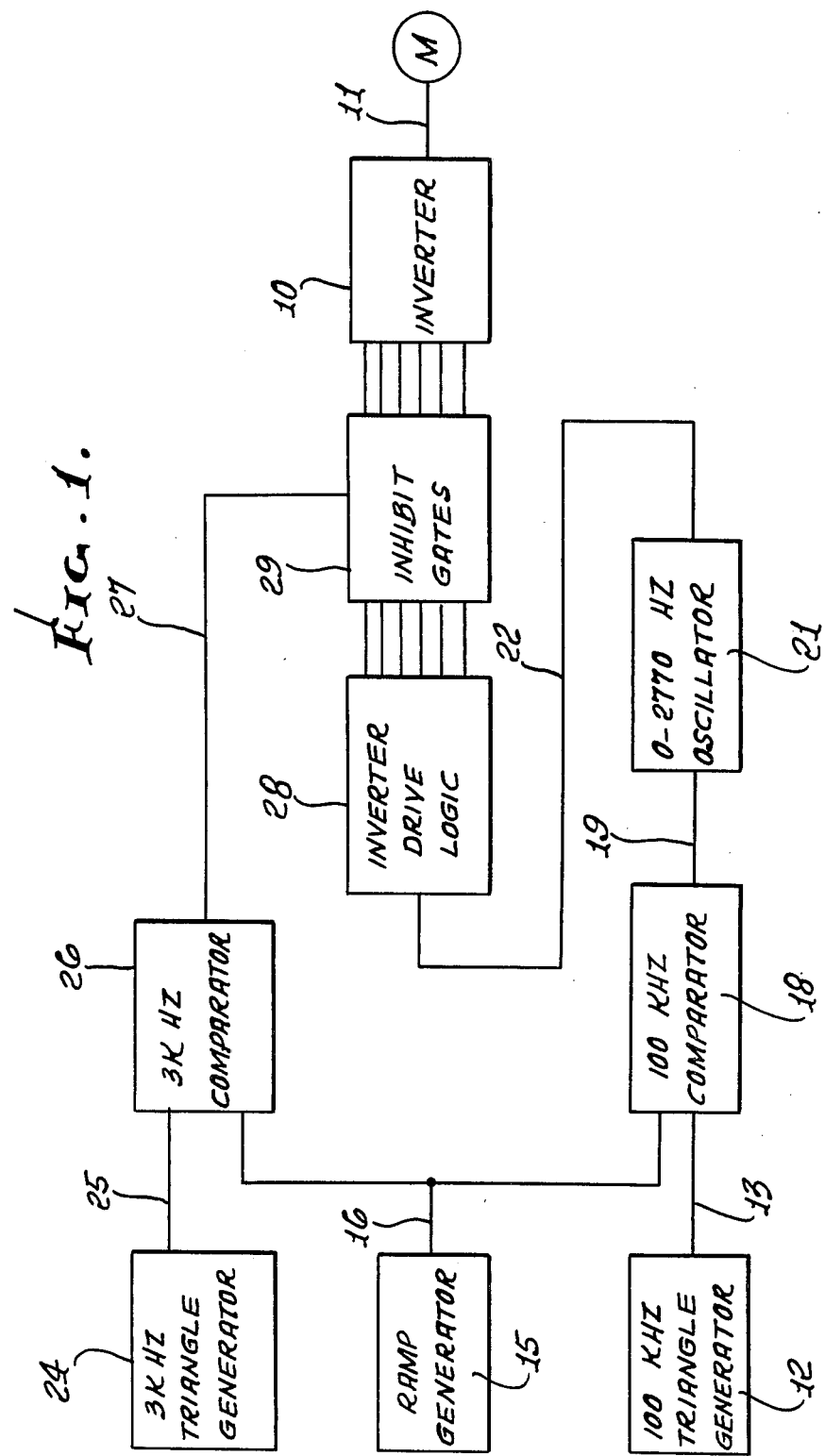

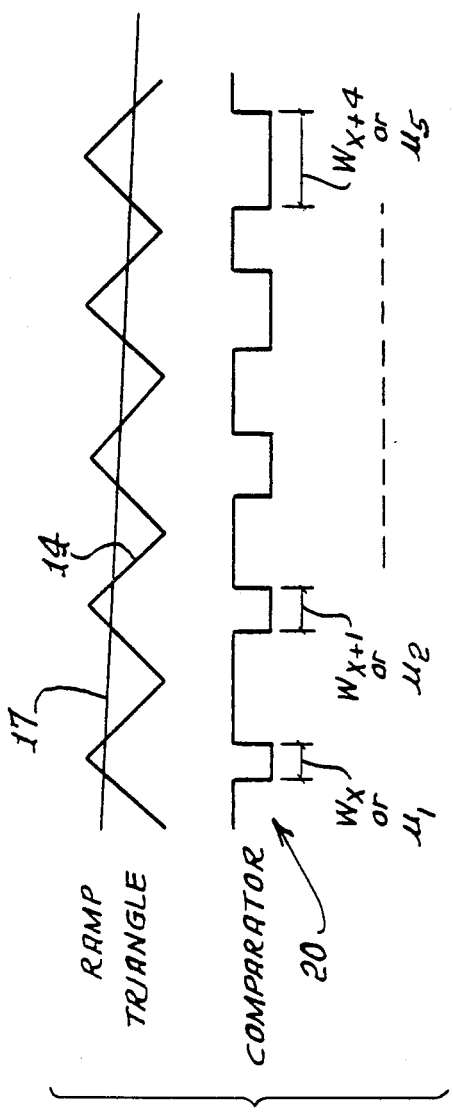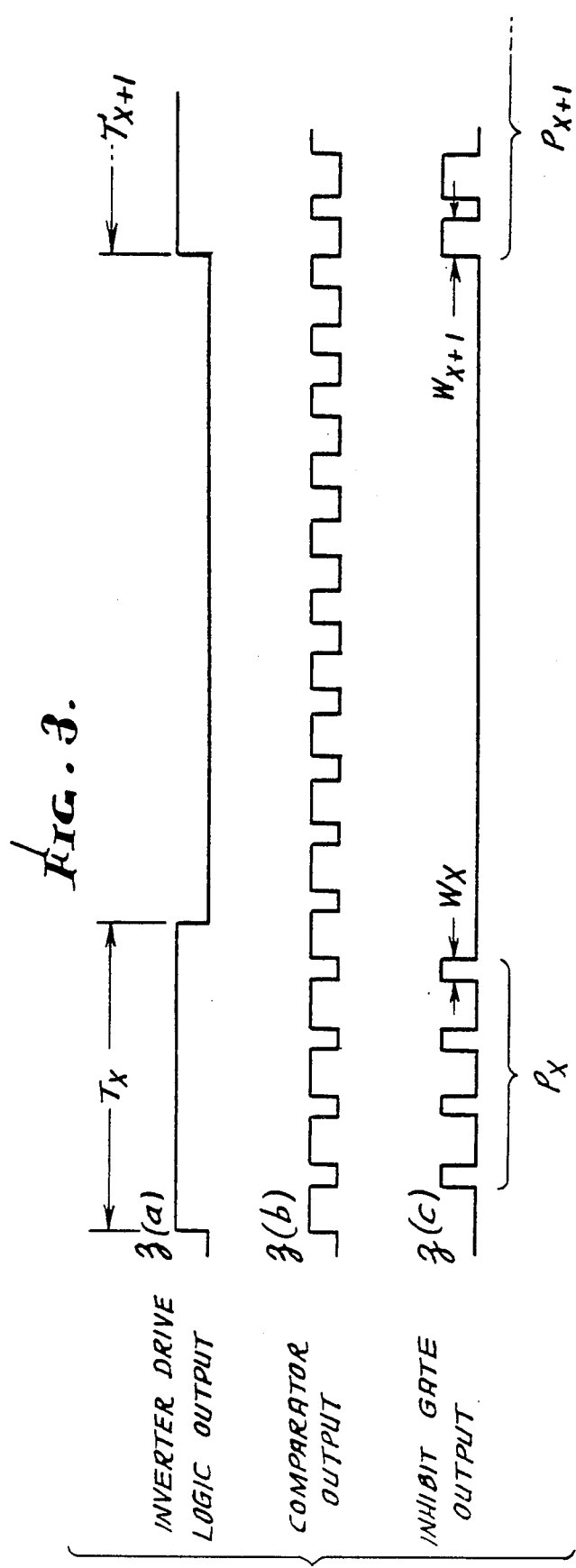

INVERTER STARTUP CIRCUIT

BACKGROUND OF THE INVENTION

This invention relates generally to inverter control of induction motors, and more particularly relates to frequency and voltage control.

The torque developed by an induction motor is low when the frequency of the applied voltage is high compared to the rotation rate of the motor. This is a problem particularly when the motor is started up from standstill. It is sometimes necessary to gradually increase the frequency of the applied voltage from very low frequency up to the desired operating frequency as the motor comes up to speed in order to develop adequate starting torque.

SUMMARY OF THE INVENTION

It is a major object of the invention to overcome the above problems through provision of a system that gradually increases both amplitude and frequency of an inverter output in order to maximize starting torque and limit current to acceptable levels.

As will be seen, the system control circuit includes circuitry to produce a control waveform characterized by a sequence of pulse groups wherein the durations of the pulse groups increases with time, and wherein the widths of the pulses within each group increases with time. Such circuitry may typically include a variable frequency output oscillator controlled by a sawtooth oscillator, ramp generator and comparator to produce an output frequency which increases with time, for controlling the pulse group durations in the control waveform.

The described circuitry may also include another comparator controlled by a ramp generator and sawtooth oscillator to produce an output characterized by a duty cycle which increases with time for controlling the widths of the pulses in the control waveforms.

These and other objects and advantages of the invention, as well as the details of an illustrative embodiment, will be more fully understood from the following specification and drawings, in which:

DRAWING DESCRIPTION

FIG. 1 is a block diagram;

FIG. 2 and FIG. 3 are waveform diagram, and

Figure 4A:
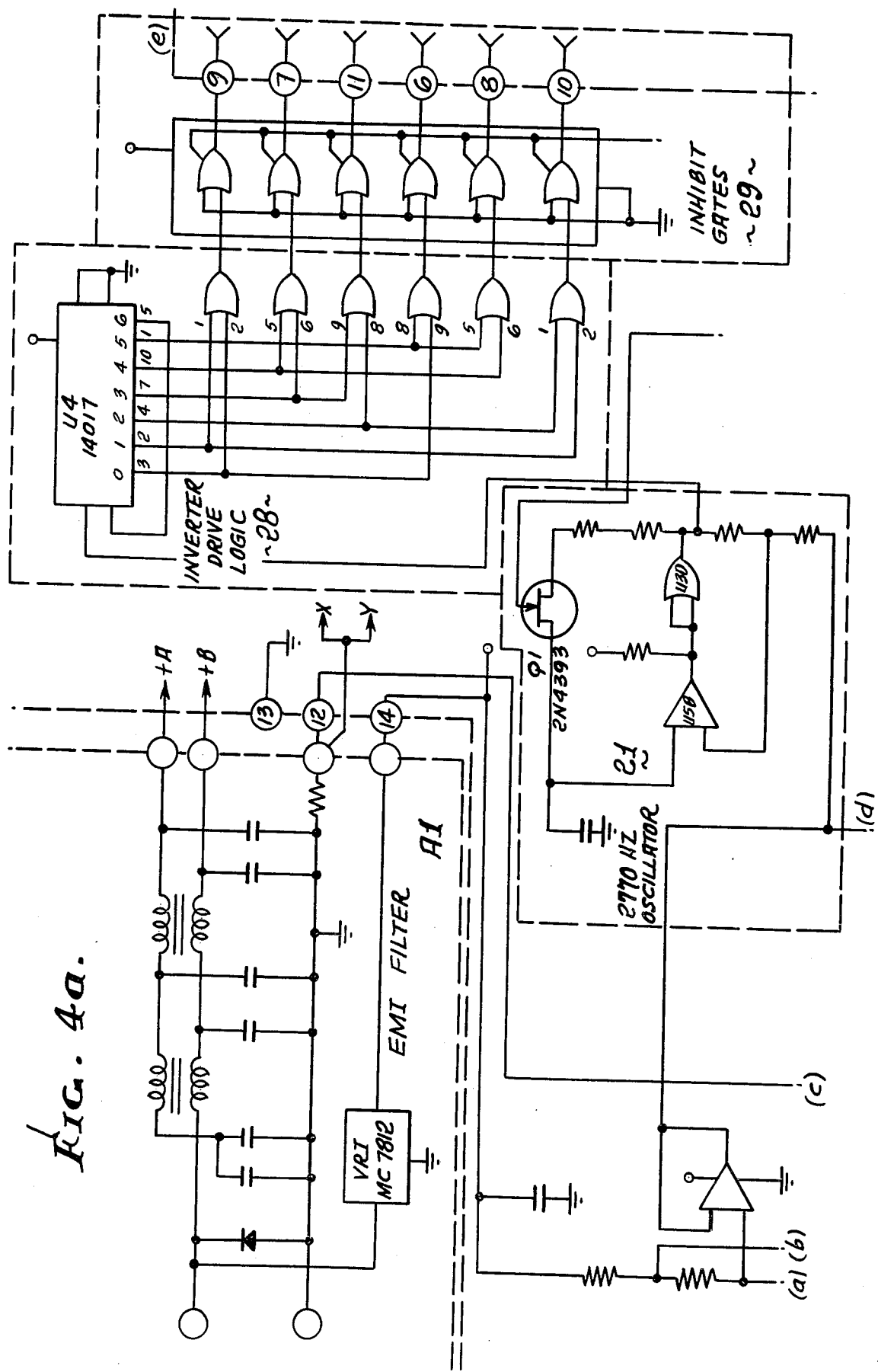
Figure 4B:
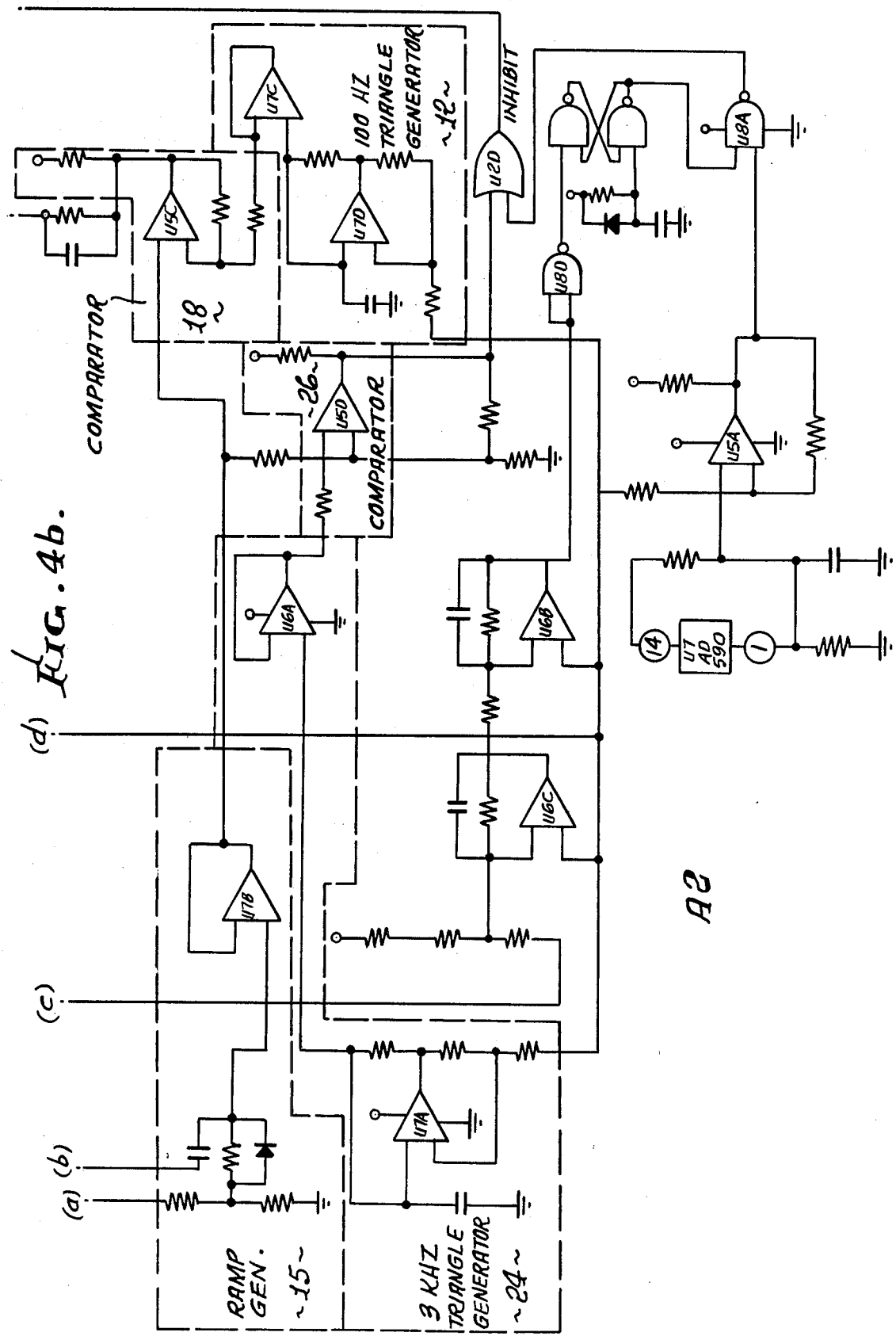
Figure 4C:
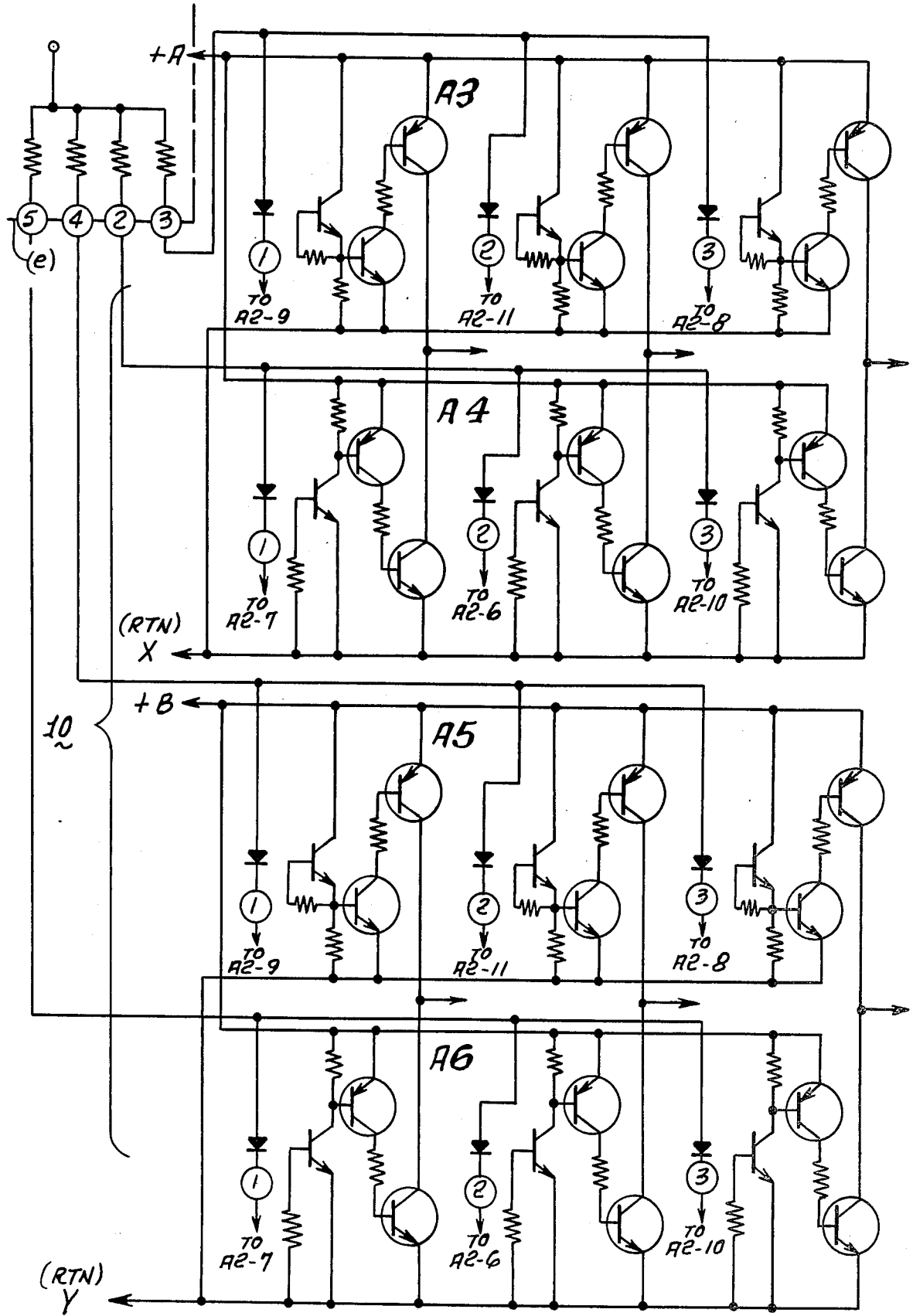

FIG. 4A, FIG. 4B, and FIG. 4C are detailed circuit diagrams.

DETAILED DESCRIPTION

Referring first to FIG. 1, a DC inverter 10 has output at 11 for controlling an induction motor M. One objective is to gradually increase the frequency of the voltage applied at 11 to the motor from very low frequency up to the desired operating frequency as the motor comes up to speed, in order to develop adequate starting torque. Another objective is to control voltage amplitude in order to limit current to acceptable levels. To these ends, circuitry is provided (see for example the circuitry to the left of the inventor) to produce a control waveform (see FIG. 3(c)) characterized by a sequency of pulse groups wherein the durations of the pulse groups increases with time, and wherein the widths of the pulses within each group increases with time. Thus pulse groups $P_x$, $P_{(x+1)}$—have associated time durations $T_x$, $T_{(x+1)}$ which increase in length, i.e. increase in duration. Also, the widths of the pulses in the sequence of groups increase with time. See the width $\omega_x$ of pulses in group $P_x$, which are less than the widths $\omega_{(x+1)}$ of the pulses in group $P_{(x+1)}$. In this regard, increase of the pulse group duration corresponds to desired rate of increase of the operation frequency of the motor M, and the increase in width $\omega$ of the pulses in successive pulse groups corresponds to increase of voltage applied to the motor.

More specifically, the circuitry of FIG. 1 includes
 (i) a first oscillator 12 having a sawtooth output at 13 (see for example output 14 in FIG. 2, that changes with time, as between 4 and 8 volts),
 (ii) ramp generator means, such as generator 15 in FIG. 1, having a voltage output 16 which changes with time (see for example output 17 in FIG. 2 which decays exponentially between 9 and 1.8 volts over the time interval between motor start-up and desired speed);
 (iii) a first comparator 18 operatively connected with and responsive to the outputs 13 and 16 to produce an output 19 characterized by a duty cycle which increases with time (see for example duty cycle wave form 20 in FIG. 2, i.e. with increasing widths $\mu_1$–$\mu_5$ corresponding to increase in the pulse duration $T_1$–$T_5$ referred to above); and
 (iv) a second oscillator 21 responsive to the comparator output at 19 to produce an output at 22 having a frequency which increases with tie (i.e. corresponding to the increase in the time durations $T_1$–$T_5$).

The generator 12 may be a 100 KHZ triangular generator; the comparator 18 may be a 100 KHZ comparator; and the oscillator 21 may have an output frequency that increases from 0 to 2770 HZ.

The circuitry of FIG. 1 also includes:
 (v) a third oscillator 24 (such as a 3 KHZ triangle generator) having a sawtooth output at 25 (see for example representative sawtooth 14 in FIG. 2);
 (vi) a second (3 KHZ) comparator 26 operatively connected with and responsive to the third oscillator output and to the ramp generator output, to produce an output at 27 characterized by a duty cycle which increases with time, for controlling the widths of the pulses in the waveform (see for example representative duty cycle 20 in FIG. 2). The associed representative widths $\omega_x$, $\omega_{x+1}$ correspond to the increasing widths $\omega_1$–$\omega_{(x+1)}$ shown in FIG. 3.

Also shown in FIG. 1 are inverter drive logic 28 and inhibit gate 29 responsive to the outputs 22 and 27 to produce the control waveform. These elements, as well as those described above are more completely shown in FIG. 4.

In a specific example, and with reference to the figure, both frequency and amplitude of the inverter are started from zero under control of the voltage ramp generator. The ramp starts at 9 volts and decays exponentially to 1.8 volts. The ramp is compared to two different triangle waves. Since the triangle waves vary from 4 to 8 volts and the ramp voltage is from 9 to 1.8 volts, the comparator duty cycles go from zero to 100%. This duty cycle variation is used to control both amplitude and frequency of the inverter.

The inverter voltage is controlled by the comparator 26 which switches at 3 KHZ. The 3 KHZ comparator output 27 controls gate 29 which controls all of the inverter driver circuits. FIG. 3 shows how the inhibiting of the inverter drive results in a waveform with a 3 KHZ switching component but with reduced voltage, at the inverter drive frequency. As the 3 KHZ comparator waveform changes in response to the ramp from 100% duty cycle to zero percent, the inverter voltage goes from 0 to full voltage.

The 100 KHZ oscillator and comparator 18 work in a similar but unique way to modify the frequency of the oscillator 21 which is the frequency controller for the inverter. Referring to the schematic, as the ramp decreases in voltage, the duty cycle of comparator 18 increases from 0 to 100%.

The output at 19 turns FET switch Q1 on and off at the 100 KHZ frequency and duty cycle. The frequency of the 2770 HZ oscillator is determined by the current from R9 and R10 charging and discharging C4. However, when Q1 is off, the charging of C4 is inhibited. Therefore, as the duty cycle of USC varies from to 9 to 100%, the frequency of the oscillator varies from 0 to 2770 HZ.

Since the voltage and frequency are both being controlled by the same voltage ramp, the result is that full voltage and frequency are reached at the same time giving optimum performance in a very simple circuit.

I claim:

1. In a control circuit for a DC inverter for an induction motor, the combination comprising
   (a) circuitry to produce a control waveform characterized by a sequence of pulse groups having durations, pulses within each group having widths, and wherein the durations of the pulse groups increase with time, and wherein the widths of the pulses within each group increase with time,
   (b) said circuitry having terminal means to supply said waveform to the inverter,
   (c) said circuitry including
      (i) a first oscillator having a sawtooth output,
      (ii) ramp generator means having a voltage output which changes with time,
      (iii) a first comparator operatively connected with and responsive to said first oscillator and ramp generator outputs to produce an output characterized by a duty cycle which increases with time, and
      (iv) a second oscillator responsive to said comparator output to produce an output having a frequency which increases with time.

2. The combination of claim 1 including an RC circuit controlled by the first comparator, and providing a variable current control for controlling the second oscillator.

3. The combination of claim 1 wherein said circuitry includes
   (v) a third oscillator having a sawtooth output,
   (vi) a second comparator operatively connected with and responsive to said third oscillator and ramp generator outputs to produce an output characterized by a duty cycle which increases with time, for controlling the widths of said pulses in said waveform.

4. The combination of claim 3 wherein said circuitry includes inverter drive logic and inhibit gate means responsive to the outputs from the second oscillator and second comparator to produce said control waveform.

5. The combination of claim 1 wherein said ramp generator output decreases with time.

6. The combination of claim 1 including said inverter coupled to said circuity, and said induction motor coupled to and controlled by said inverter.

7. In a control circuit for a DC inverter for an induction motor, the combination comprising
   (a) circuitry to produce a control waveform characterized by a sequence of pulse groups havng durations, pulses within each group having widths, and wherein the durations of the pulse groups increase with time, and wherein the widths of the pulses within each group increase with time,
   (b) said circuitry having terminal means to supply said waveform to the inverter,
   (c) and including said inverter coupled to said circuitry, and including said induction motor coupled to and controlled by said inverter.

8. The combination of claim 3 including said inverter coupled to said circuitry.

9. The combination of claim 8 including said induction motor coupled to and controlled by said inverter.

* * * * *